(No Model.) 3 Sheets—Sheet 1.

E. D. SCHMITT & G. N. HINCHMAN.
CLUTCH.

No. 508,052. Patented Nov. 7, 1893.

Attest:
Fred F. Kemper
J. E. Greer

Inventors;
Edward D. Schmitt.
George N. Hinchman
by Gifford & Law
Attorneys.

THE NATIONAL LITHOGRAPHING COMPANY,
WASHINGTON, D. C.

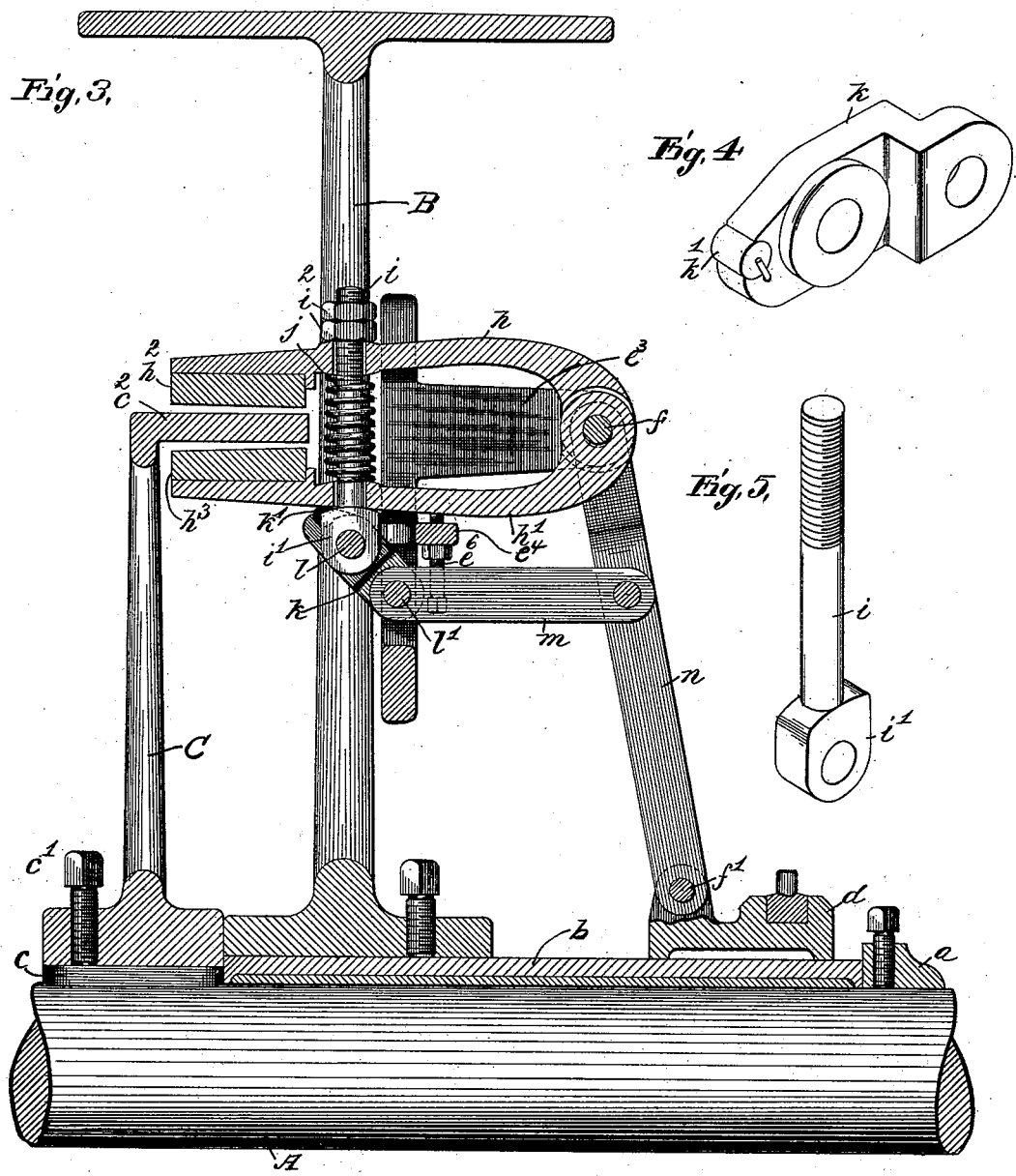

(No Model.) 3 Sheets—Sheet 3.
E. D. SCHMITT & G. N. HINCHMAN.
CLUTCH.
No. 508,052. Patented Nov. 7, 1893.
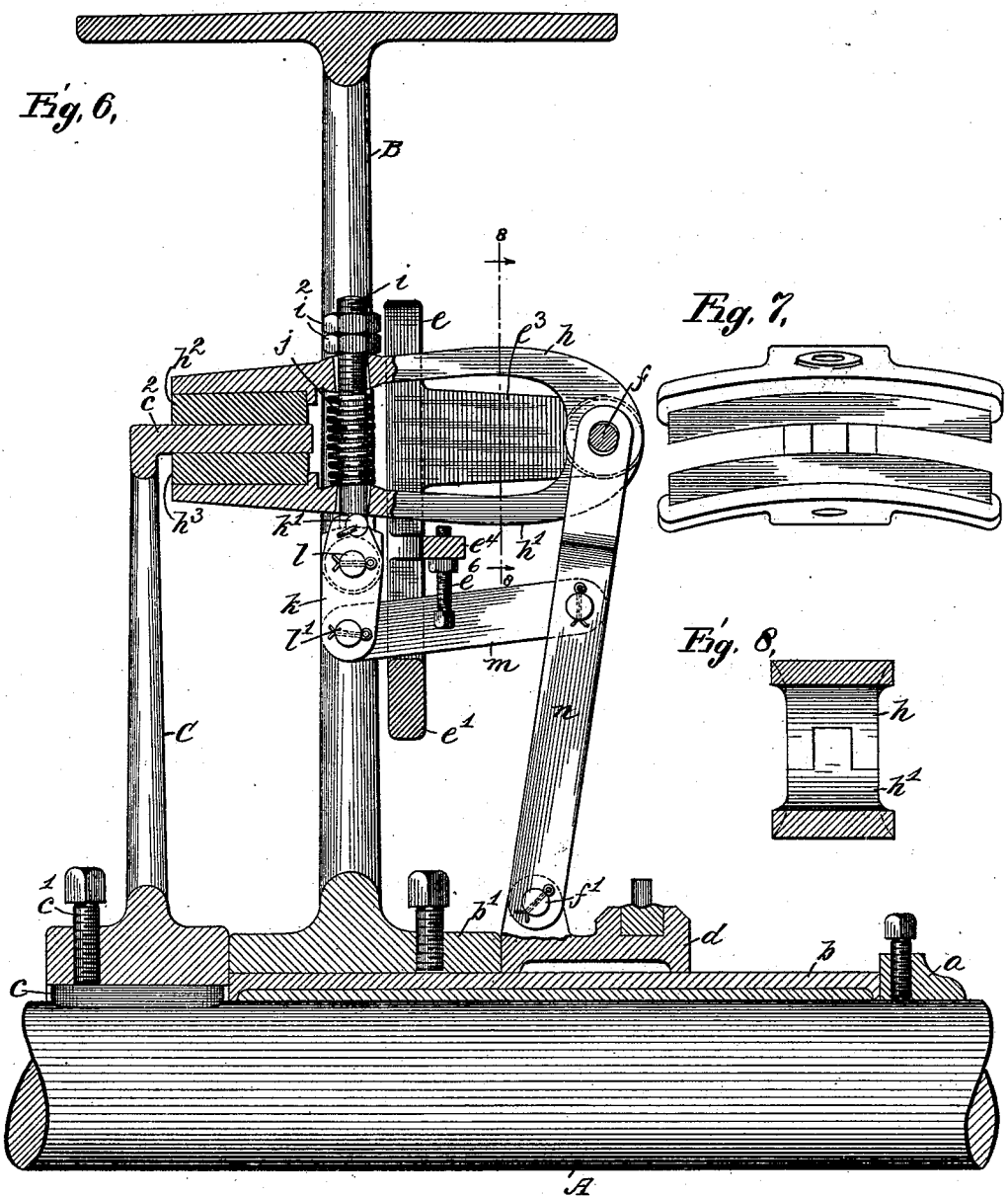
Attest:
Fred F. Kemper
J. E. Greer
Inventors:
Edward D. Schmitt
George N. Hinchman
by Gifford & Law
Attorneys.

UNITED STATES PATENT OFFICE.

EDWARD D. SCHMITT AND GEORGE N. HINCHMAN, OF CUYAHOGA FALLS, OHIO, ASSIGNORS TO THE FALLS RIVET AND MACHINE COMPANY, OF SAME PLACE.

CLUTCH.

SPECIFICATION forming part of Letters Patent No. 508,052, dated November 7, 1893.

Application filed November 26, 1892. Serial No. 453,288. (No model.)

*To all whom it may concern:*

Be it known that we, EDWARD D. SCHMITT and GEORGE N. HINCHMAN, of Cuyahoga Falls, in the State of Ohio, have invented a new and useful Improvement in Clutches, of which the following is a specification.

Figure 1:
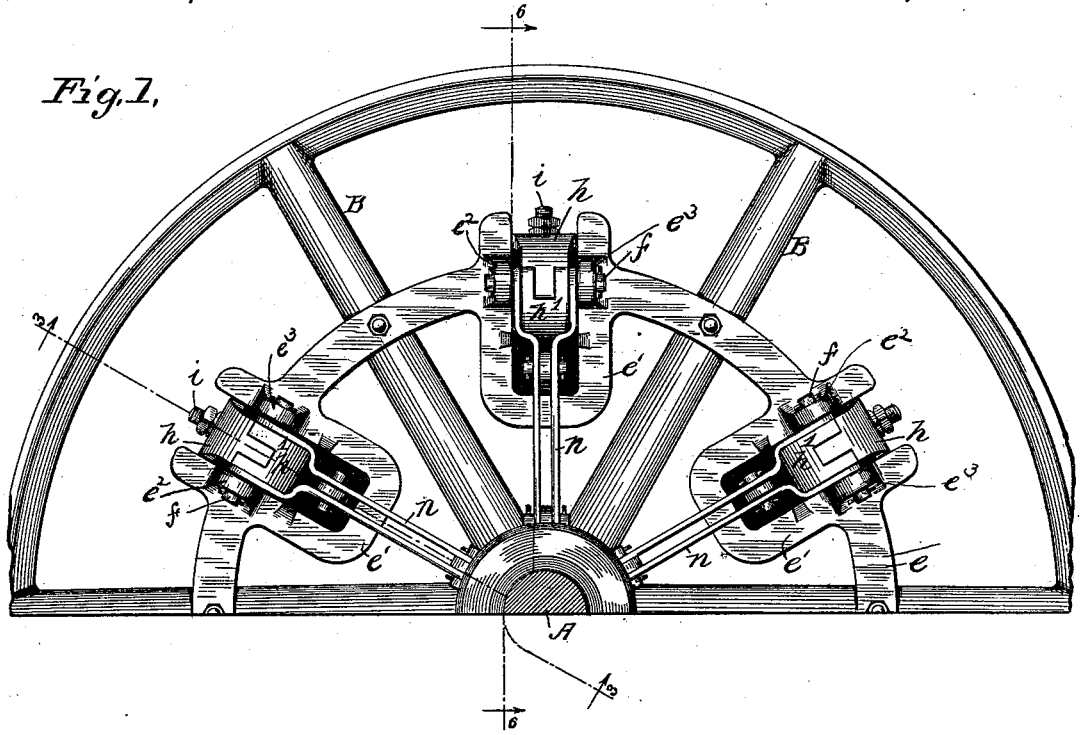
Figure 2:
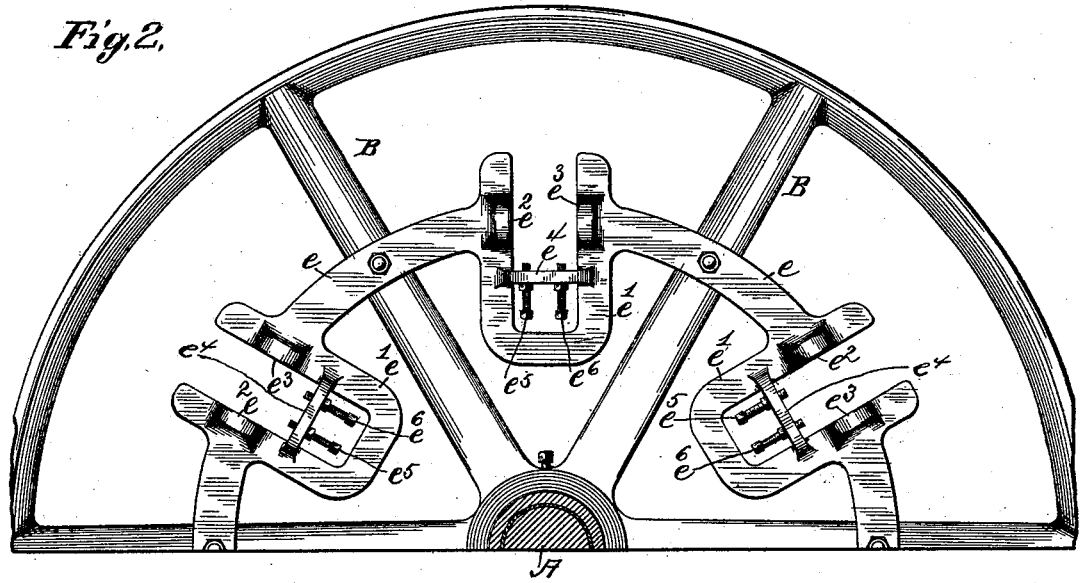

In the accompanying drawings, Figure 1 is a face view of one half of a pulley having the clutching devices mounted thereon the bridge piece $e^4$ and the set screws $e^5$ and $e^6$ which are clearly shown in the other figures, being omitted. Fig. 2 is a similar view of the same with the clutch devices dismounted. Fig. 3 is a cross section on the line 3, 3 of Fig. 1. Figs. 4 and 5 are details. Fig. 6 is a cross section on the line 6, 6, of Fig. 1. Fig. 7 is a detail showing the jaws detached in front view. Fig. 8 is a cross section of the jaws on the line 8, 8, of Fig. 6.

A is a shaft continually revolving.

B is a pulley.

C is a wheel secured to the shaft by the key $c$ and set screw $c'$ and carrying the clutch ring $c^2$.

$b$ is the bushing of the pulley held between the hub of the wheel C and a collar $a$ fixed upon the shaft.

$d$ is a shifter revolving with the pulley and reciprocating between the collar $a$ and the hub $b'$ of the pulley.

$e$ is a ring bolted or otherwise secured to the pulley and provided at intervals, as shown, with the yokes $e'$; preferably one between every two pulley spokes. Each of these yokes is provided with ears $e^2$ $e^3$ projecting at right angles with the plane of the pulley and bored to receive the pin $f$ of the jaws. Each yoke $e'$ is also provided with a bridge piece $e^4$ containing the set screws $e^5$ and $e^6$.

$h$ and $h'$ are the jaws pivotally connected together on one side of the pulley by the pin $f$ and projecting from the other side of the pulley where they are shod with the gripping faces $h^2$ and $h^3$ one on each side of the flange $c^2$.

$i$ is a pin extending through the two jaws and provided on one end with the head $i'$, shown in detail in Fig. 5, and on the opposite end with a screw thread to receive the jam-nuts $i^2$. Upon this pin and interposed between the two jaws is a coiled spring $j$.

$k$, shown in detail in Fig. 4, is a lever which is pivoted to the head $i'$ by the pin $l$ and is provided on one end with a friction roller $k'$ that bears against the jaw $h'$, and on the other end with a pin $l'$ that couples it to a link $m$ which in turn is coupled to a lever $n$ which is pivoted at one end to the pin $f$ and at the other end by the pin $f'$ to the shifter $d$.

The operation of the contrivance is as follows: When the shifter is in the position shown in Fig. 3, the jaws are held open by the coiled spring $j$ and are supported so as to be substantially equidistant from the ring $c^2$ by the set screws $e^5$, $e^6$. In this condition, the shaft, together with the wheel C and the clutch ring $c^2$, revolve; but the pulley, together with the shifter $d$ and the clutch mechanism are stationary, in which mode of operation this clutch is distinguished from those in which the clutch mechanism is fixed to and revolves with the shaft and the clutch ring is borne by the pulley. In our clutch, the fact that the clutch mechanism is borne by the pulley and therefore is at rest when the pulley is at rest, enables it to be readily repaired or adjusted if need be even while the shaft is running. When the clutch jaws are to be closed to start the pulley, the shifter is slid from the position shown in Fig. 3 to the position shown in Fig. 6, which motion causes the lever $n$ (acting as a lever of the second order having its fulcrum on the pin $f$) to shove the link $m$ forward so as to swing the lever $k$ (acting as a lever of the first order fulcrumed on the pin $l$) into a vertical or nearly vertical position causing the friction roller $k'$ to thrust against the jaw $h'$ and the nut $i^2$ on the pin $i$ to pull against the jaw $h$. Thus, the two jaws are drawn together in antagonism to the coiled spring $j$ until they firmly clutch the ring $c^2$, in which position they may be doubly locked by the fact that in the motion from the position of Fig. 3 to the position of Fig. 6, both the lever $n$ and the lever $k$ may be constructed as shown in the drawings to pass the radial lines passing through the pivots $f$ and $l$. A ready means of adjustment is provided in the nuts $i^2$, the tightening or loosening of which affects the two jaws equally.

We claim—

1. In combination, a clutch supporting wheel or pulley, a pair of arms carrying friction jaws at one end and pivotally connected to said wheel or pulley at or near the opposite end, a rod connecting said arms intermediate the jaws and the pivot and mechanism whereby a longitudinal pull is exerted on said rod to draw one of said jaws toward the other and mechanism whereby said other jaw is held from retreating, substantially as described.

2. In combination, a clutch supporting wheel or pulley, a pair of arms carrying friction jaws at one end and pivotally connected to said wheel or pulley at or near the opposite end, a rod connecting said arms intermediate the jaws and the pivot and a spring interposed between said jaws and acting in antagonism to the pull on said rod and mechanism whereby a longitudinal pull is exerted on said rod to draw one of said jaws toward the other and mechanism whereby the other jaw is held from retreating, substantially as described.

3. In combination, a clutch supporting wheel or pulley, a pair of arms carrying friction jaws at one end and pivotally connected to said wheel or pulley at or near the opposite end, a rod connecting said arms intermediate the jaws and the pivot and an adjustable nut upon said rod whereby the jaws may be adjusted and mechanism whereby a longitudinal pull is exerted on said rod to draw one of said jaws toward the other and mechanism whereby the other jaw is held from retreating, substantially as described.

4. In combination, a clutch supporting wheel or pulley, a pair of arms carrying friction jaws at one end and pivotally connected to said wheel or pulley at or near the opposite end, a rod connecting said arms intermediate the jaws and the pivot, and a rest, as the set screw $e^5$, to regulate the positions of the jaws and mechanism whereby a longitudinal pull is exerted on said rod to draw one of said jaws toward the other and mechanism whereby the other jaw is held from retreating, substantially as described.

5. In combination, a clutch supporting wheel or pulley, a pair of arms carrying friction jaws at one end and pivotally connected to said wheel or pulley at or near the opposite end, a rod connecting said arms intermediate the jaws and the pivot, a lever pivoted to one end of said rod and bearing against one of said arms and means whereby said lever is operated, substantially as described.

6. In combination, a clutch supporting wheel or pulley, a pair of arms carrying friction jaws at one end and pivotally connected to said wheel or pulley at or near the opposite end, a rod connecting said arms intermediate the jaws and the pivot, a lever pivoted to one end of said rod, a shifting sleeve, a second lever connected with said sleeve and a link interposed between said two levers, substantially as described.

7. In combination with the wheel of a pulley, a friction clutch ring $e$ having at intervals the yokes $e'$ each provided with a bridge-piece $e^4$, a set screw $e^5$, and the jaws $h\,h'$, substantially as described.

EDWARD D. SCHMITT.
GEORGE N. HINCHMAN.

Witnesses:
E. L. BABCOCK,
SAML. HIGGS.